Dec. 12, 1933.   H. W. RUPPLE   1,939,320
STOCK FEEDING MECHANISM
Filed Oct. 14, 1931   9 Sheets-Sheet 1

FIG. 1

INVENTOR.
HARRY W. RUPPLE
ATTORNEY.

Dec. 12, 1933.  H. W. RUPPLE  1,939,320
STOCK FEEDING MECHANISM
Filed Oct. 14, 1931   9 Sheets-Sheet 2

FIG. 2

INVENTOR.
HARRY W. RUPPLE
BY
ATTORNEY.

Dec. 12, 1933.  H. W. RUPPLE  1,939,320
STOCK FEEDING MECHANISM
Filed Oct. 14, 1931     9 Sheets-Sheet 3

FIG. 3

INVENTOR.
HARRY W. RUPPLE
BY
ATTORNEY.

Dec. 12, 1933.  H. W. RUPPLE  1,939,320

STOCK FEEDING MECHANISM

Filed Oct. 14, 1931  9 Sheets-Sheet 5

FIG. 5

INVENTOR.

HARRY W. RUPPLE

BY

ATTORNEY.

Dec. 12, 1933.   H. W. RUPPLE   1,939,320
STOCK FEEDING MECHANISM
Filed Oct. 14, 1931   9 Sheets-Sheet 6

FIG. 6

INVENTOR.
HARRY W. RUPPLE
BY
Kwis Hudson & Kent.
ATTORNEY.

Dec. 12, 1933.  H. W. RUPPLE  1,939,320
STOCK FEEDING MECHANISM
Filed Oct. 14, 1931   9 Sheets-Sheet 7

INVENTOR.
HARRY W. RUPPLE
BY
ATTORNEY.

FIG. 9

Dec. 12, 1933.   H. W. RUPPLE   1,939,320
STOCK FEEDING MECHANISM
Filed Oct. 14, 1931   9 Sheets-Sheet 9

INVENTOR:
HARRY W. RUPPLE
BY
Kwis Hudson & Kent
ATTORNEYS

Patented Dec. 12, 1933

1,939,320

UNITED STATES PATENT OFFICE 1,939,320

STOCK FEEDING MECHANISM

Harry W. Rupple, Shaker Heights, Ohio, assignor to The Cleveland Automatic Machine Company, Cleveland, Ohio, a corporation of Ohio Application October 14, 1931. Serial No. 568,750

6 Claims. (Cl. 29—63)

The present invention relates to an automatic metal working machine and more particularly to the stock feeding mechanism thereof or a stock feeding attachment therefor. The invention is particularly applicable to automatic machines either of the single or multiple position types wherein stock bars are automatically fed through rotatable spindles and operated upon by one or a plurality of tools, but may be applied to other types of machine tools without changing the principle of construction and/or operation.

An object of the present invention is the provision of an improved stock feeding device which will be compact, simple and rugged in construction, and reliable in operation, and which will be capable of feeding various amounts of stock in a limited space of time.

A further object of the invention is the provision of an improved stock feeding device which will act to protect the machine from breakage in the event that the stock becomes jammed therein and which will be disengaged from the stock when not in actual operation.

Other objects and advantages of the invention will be apparent to those skilled in the art from the following description of the preferred embodiment of the invention described with reference to the accompanying drawings, in which:

The preferred embodiment of the invention is illustrated in Figs. 1 to 5 inclusive which show a specific construction of feed mechanism applied to a single position automatic machine tool. Figs. 6 to 12 inclusive illustrate a modified construction of the feeding mechanism shown in Figs. 1 to 5 inclusive applied to a multiple position automatic machine tool. However, either feeding mechanism shown can be applied to a single or a multiple position machine with slight changes in construction, all of which will be apparent to those skilled in the art, and such constructions are contemplated and within the scope of the present invention.

Figure 1:
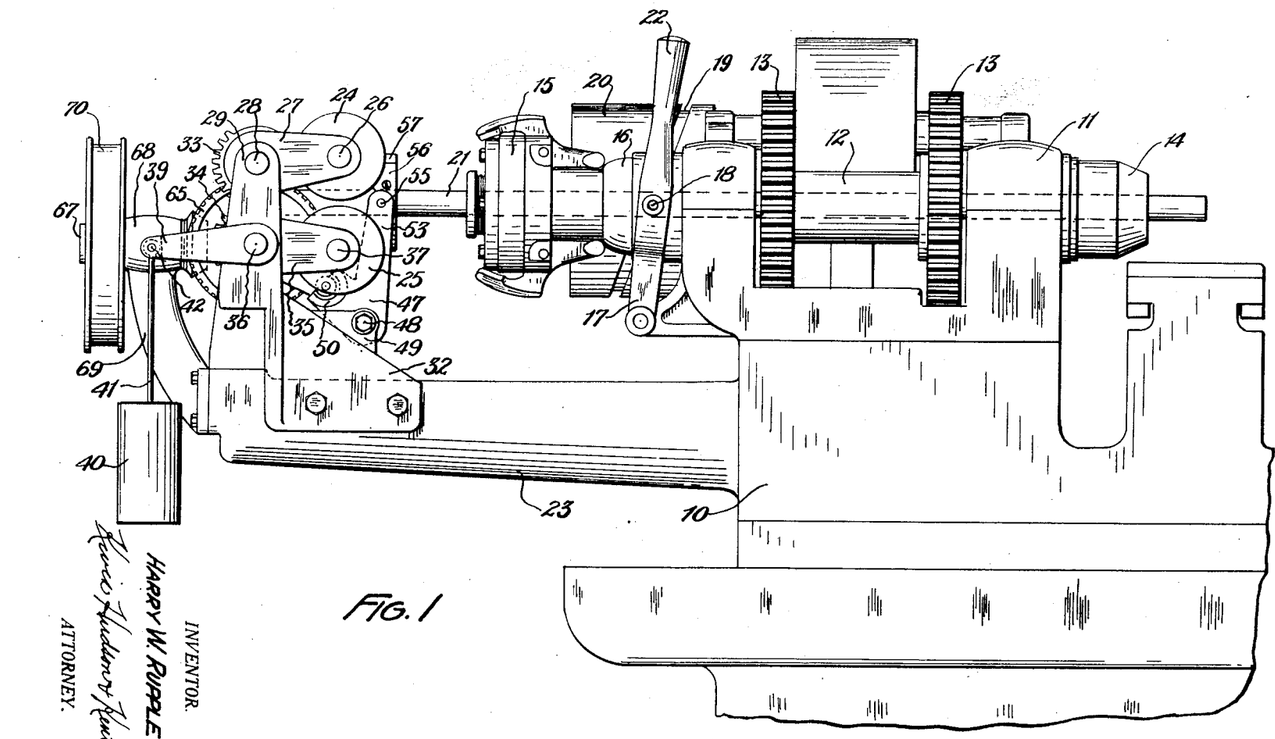
Figure 1 is a front elevational view of the spindle end of a single position automatic machine tool showing my improved stock feeding mechanism.
Figure 2:
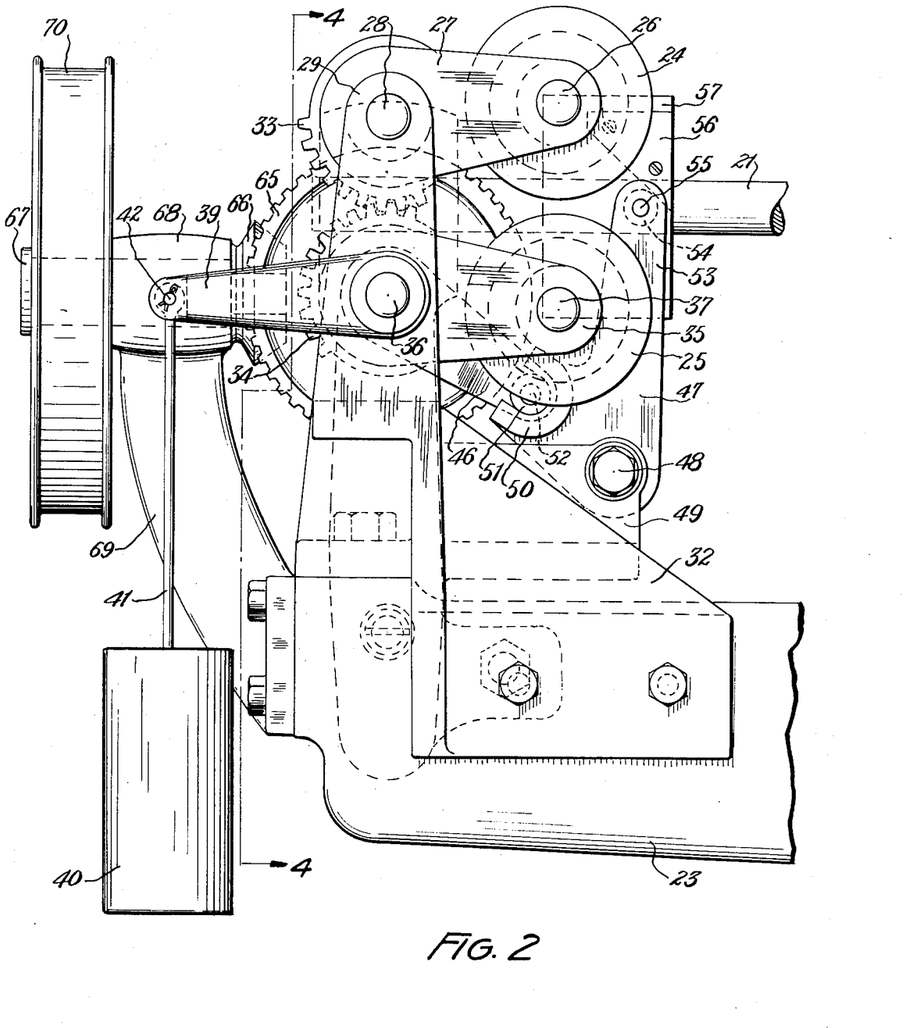
Fig. 2 is an enlarged front elevational view of the stock feeding mechanism shown in Fig. 1.
Figure 3:
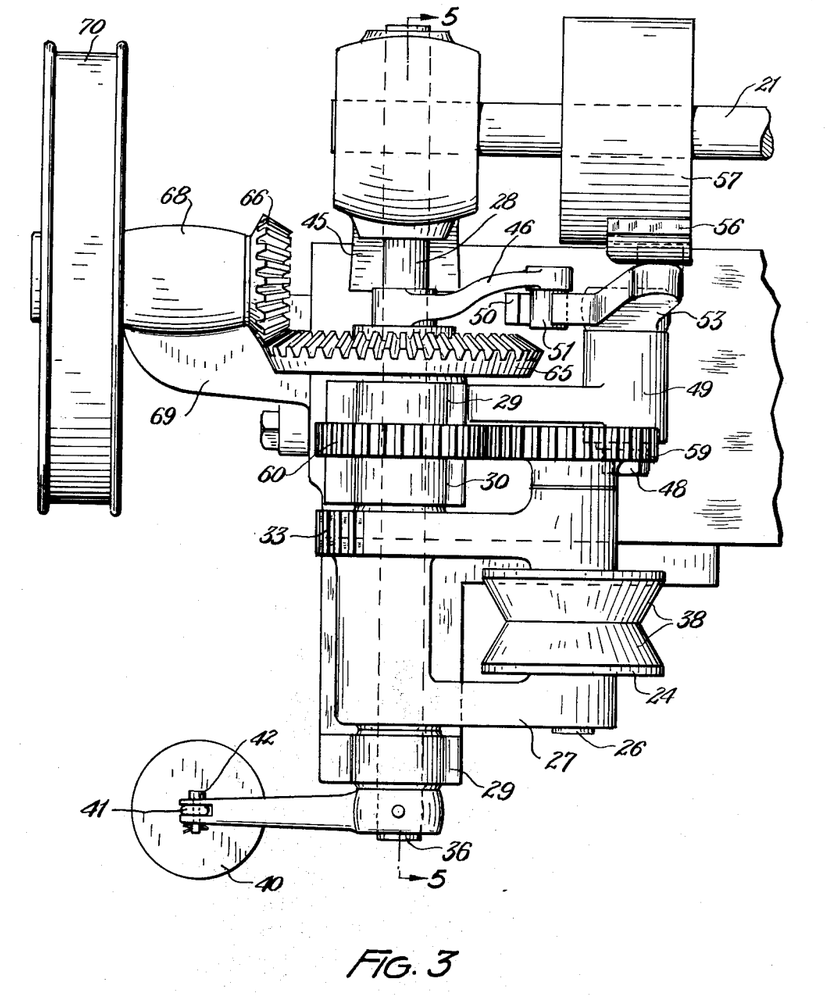
Fig. 3 is a plan view of the stock feeding mechanism shown in Figs. 1 and 2.
Figure 4:
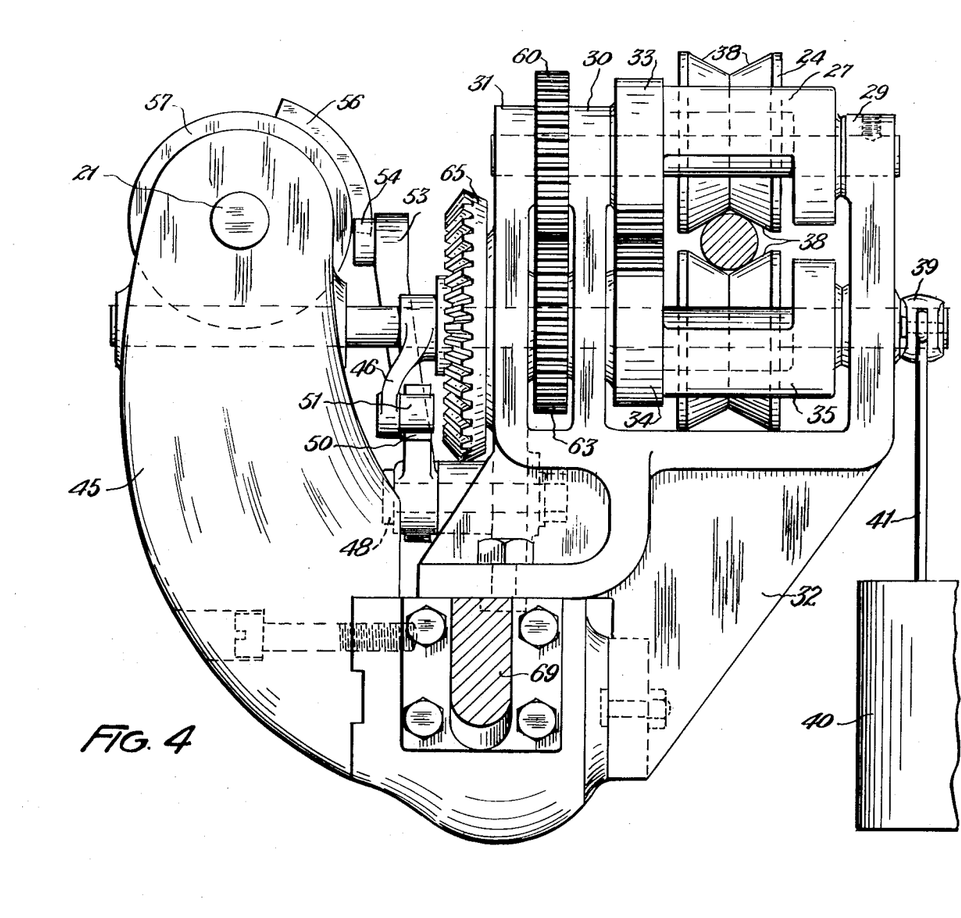
Fig. 4 is an end view of the stock feeding mechanism shown in Figs. 1 and 2.
Figure 5:
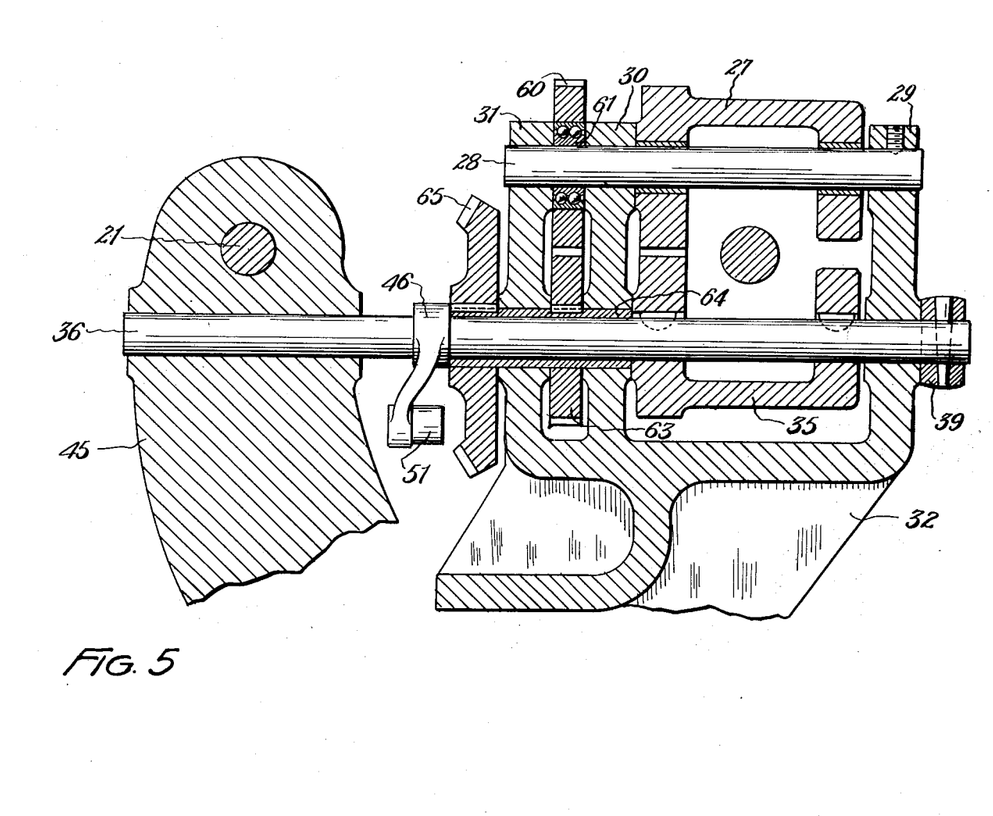
Fig. 5 is a view with portions in section taken on the line 5—5 of Fig. 3.

The spindle end only of a single position automatic machine tool is illustrated in Fig. 1 as the machine per se does not form a part of the present invention and may be found in a plurality of different embodiments well known in the art. The reference character 10 indicates the bed of the machine which carries at the right-hand end thereof a spindle head 11 in which a spindle 12 is rotatably mounted and driven by the gears 13 in any well known manner.

The spindle 12 may be of any ordinary construction. The one illustrated is of the type adapted to have the work blank or stock bar fed by automatic means through the center thereof, and is similar to that shown in United States Patent No. 1,779,529 to J. P. Brophy, issued October 28, 1930. The spindle 12 carries at one end a chuck member 14, the jaws of which are adapted to be operated by mechanism, indicated in general by the reference character 15 adjacent the other end of the spindle, in timed relation to the other operations of the machine and the feeding mechanism. The mechanism 15 is operated by a chuck thimble or member 16 slidable longitudinally of the spindle 12 by a lever 17 pivoted to the bed 10 and provided with pins 18 adapted to engage in a groove about the periphery of the thimble or member 16. The lever 17 carries a cam roller (not shown) adapted to engage in the cam track 19 on the cam drum 20 mounted on the main cam shaft 21 of the machine and driven from the main drive in any suitable manner. A hand grasp 22 is provided on the lever 17 for manual operation.

The feeding mechanism is supported at the left of the spindle, as viewed in Fig. 1, on a horn 23 integral with the bed 10, and comprises a pair of driven rollers 24 and 25 adapted to be moved into and out of engagement with the work to perform the feeding operation. The roller 24 is keyed to a short shaft 26 rotatably mounted in the free ends of a double armed bracket 27. The bracket 27 is rotatably mounted on a shaft 28 supported in vertical projections 29, 30 and 31 of a bracket 32 bolted or otherwise secured to the horn 23. The bracket 27 is provided with a gear sector 33 formed integral therewith and in mesh with a similar gear sector 34 on a double armed bracket 35, similar in construction to the double armed bracket 27, keyed to a shaft 36 rotatably mounted in the vertical projections 29, 30 and 31 beneath the shaft 28. The roller 25 is keyed to a short shaft 37 rotatably carried in the free ends of the bracket 35. The rollers 24 and 25 have V-shaped faces 38 adapted to engage a circular work piece positioned therebetween, see Figs. 3 and 4.

An arm 39 is keyed to the shaft 36 at the front of the machine and carries at its free end a weight 40 secured thereto by a rod 41 and a pin 42. The construction is such that the weight 40 continuously urges the shaft 36 in a counterclockwise direction, as viewed in Figs. 1 and 2. Movement of the shaft 36 in this direction moves the bracket 35 keyed thereto to engage the roller 25 with one side of the work and through the gear sectors 33 and 34 the bracket 37 which is rotatably mounted on the shaft 28 in a clockwise direction to engage the roller 24 with the other side of the work.

The rollers 24 and 25 are moved to disengage the work by clockwise rotation of the shaft 36 and held out of engagement therewith by the following mechanism. The shaft 36 projects to the rear of the machine and is supported at its rear end by a bracket 45 bolted or otherwise secured to the horn 23, and carries an arm 46 fixed thereto between the bracket 45 and the vertical projection 31 of the bracket 32. A bell-crank lever 47 is pivotally mounted on a pin 48 fixed to a part 49 of the bracket 32 and carries on one arm thereof a yoke end 50 adapted to engage a roller 51 mounted on a pin 52 fixed to the free end of the arm 46. The other arm 53 of the bell-crank lever 47 carries a cam roller 54 rotatably mounted on pin 55 and adapted to engage and be operated by a cam plate 56 on a cam disk 57 carried by the cam shaft 21. The left-hand end of the cam shaft 21, as viewed in Fig. 1, is rotatably supported in the bracket 45. The rollers 24 and 25 are driven in the following manner. A gear 59 is keyed or otherwise fixed on the shaft 26 at the rear end thereof and is in mesh with a gear 60 rotatably mounted in anti-friction bearings 61 on the shaft 28. The gear 60 is in mesh with a gear 63 keyed on a short sleeve 64 rotatably mounted independent of and surrounding the shaft 35, in the vertical projections 30 and 31. A gear similar to gear 59 is keyed on the shaft 37 and in mesh with gear 63.

A bevel gear 65 keyed or otherwise secured on the sleeve 64 is in mesh with a pinion gear 66 fixed on one end of a short shaft 67. The shaft 67 is rotatably supported in a boss 68 on a bracket 69 bolted or otherwise fixed to the end of the horn 23, and carries a pulley wheel 70 for driving the same. The rollers 24 and 25 may be driven in any suitable manner other than that illustrated, either from the cam shaft 21 or the main drive for the machine and may be continuously or intermittently rotated. The feeding mechanism just described may be applied to a multiple position machine by adapting the bracket 32 to support a plurality of double armed brackets 27 and 35 and rollers 24 and 25, etc., as will be apparent to those skilled in the art.

In the modification of the feeding mechanism illustrated in Figs. 6 to 12 inclusive, the feed rollers are engaged and disengaged with the work by fluid pressure actuated means and the device is shown applied to a multiple position machine. The machine, the spindle end of which only is shown in the drawings, is designated in general by the reference character 75 and is any well known automatic machine of the multiple position type.

A plurality of spindles 76 similar in construction to the spindle 12 previously referred to, are rotatably mounted in a spindle head 77 and driven from the main drive of the machine in any well known manner. The spindles 76 carry at one end a chuck member 78, the jaws of which are adapted to be operated by mechanisms indicated in general by the reference character 79 which mechanisms are, in turn, operated by the chuck thimbles or members 80 slidably mounted on the spindles 76. The thimbles or members 80 are provided with a groove 81 adapted to be engaged by a shoe 82 slidably supported on pins 83 fixed to the spindle head 77. A shaft 84 is rigidly secured at one end to the center of the shoe 82 and slidably supported at the other end in the boss 85 on a bracket 86 secured to the base or horn of the machine 75.

A shaft 87 supported in a boss 88 on the bracket 86 and a bracket 89 secured to the spindle head 77 carries a sleeve or split collar 90 adjustable thereon. A lever 91 pivotally connected at one end to the collar 90 by means of a pin 92 is provided near the middle with an enlarged portion 93 having an opening 94 through which the shaft 84 projects. A bolt 95 extends through the enlarged portion 93 of the lever 91 and the shaft 84 and pivotally connects these parts together. The lower end of the lever 91 is provided with a finished head 96 adapted to engage within a slot 97 on a member 98 slidably mounted on a pair of rods 99 supported by the spindle head 77 and the bracket 86. The member 98 carries a cam roller 100 rotatably mounted on a pin 101 fixed to the member 98 in any suitable manner. The cam roller 100 engages in and is operated by a cam groove 102 on a cam drum 103 fixed to the main cam shaft 104 of the machine.

The construction is such that rotation of the cam drum 103, through the cam groove 102 and the cam roller 100, slides the member 98 along the rods 99 in timed relation to the other operations of the machine. The member 98 in turn moves the lever 91 about the pivot pin 92 and the shaft 84 together with the shoe 82 is moved to operate the chuck jaws.

Figure 6:
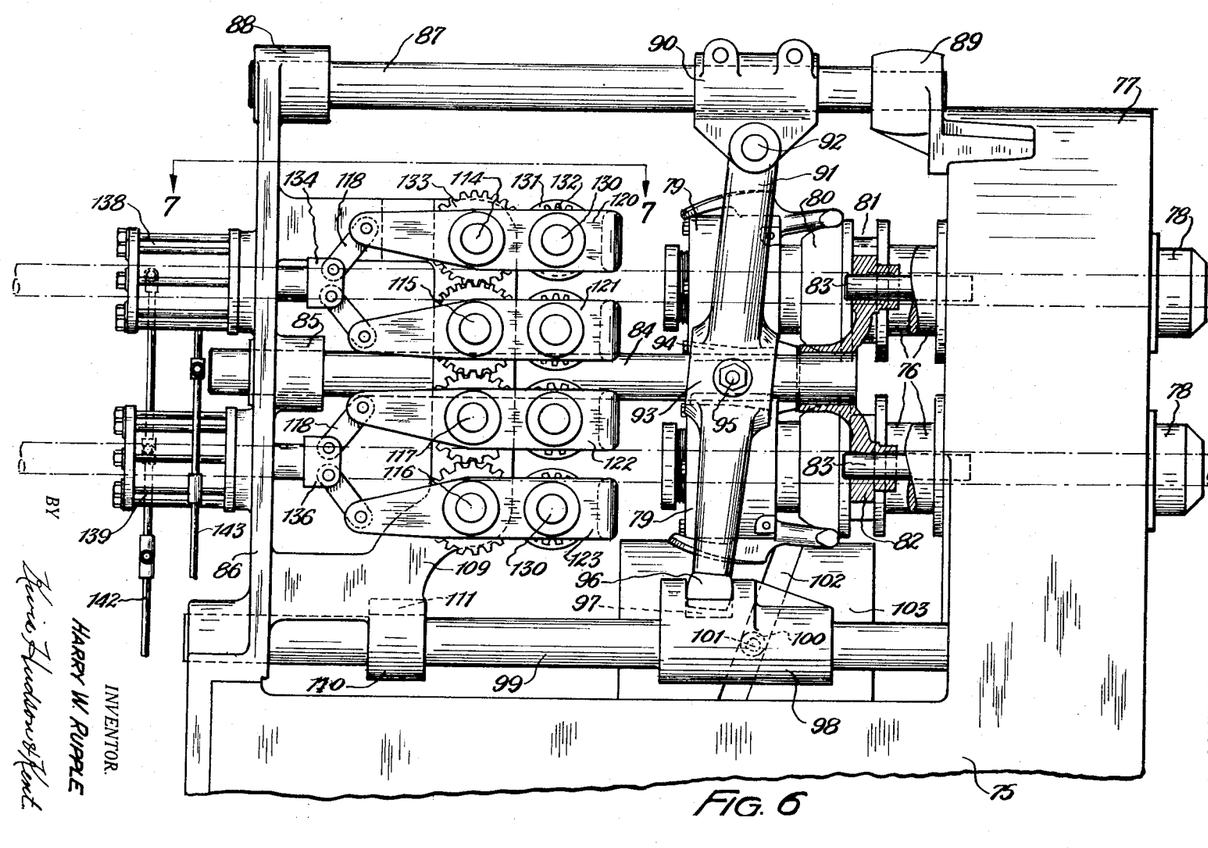
Fig. 6 is a front view, with portions broken away to show the chuck operating mechanism of the spindle end of a multiple position automatic machine tool provided with a modified construction of the stock feeding mechanism shown in Figs. 1 to 5 inclusive.
Figure 7:
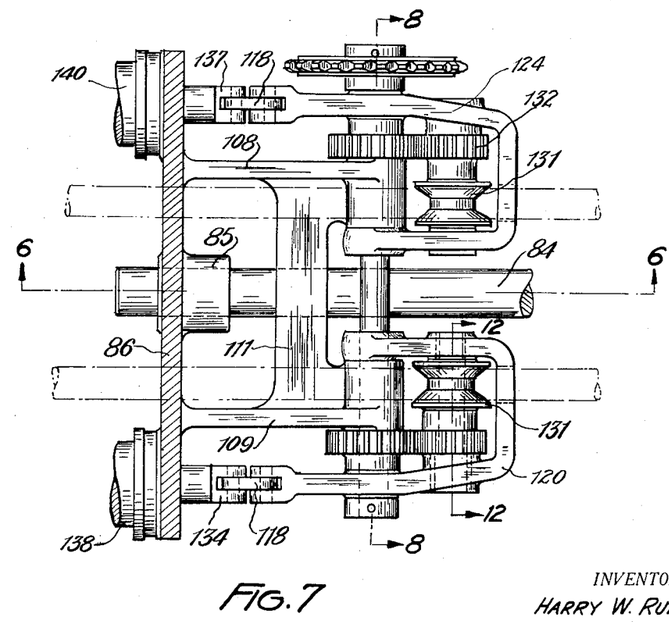
Fig. 7 is a view with parts in section taken on the line 7—7 of Fig. 6.
Figure 8:
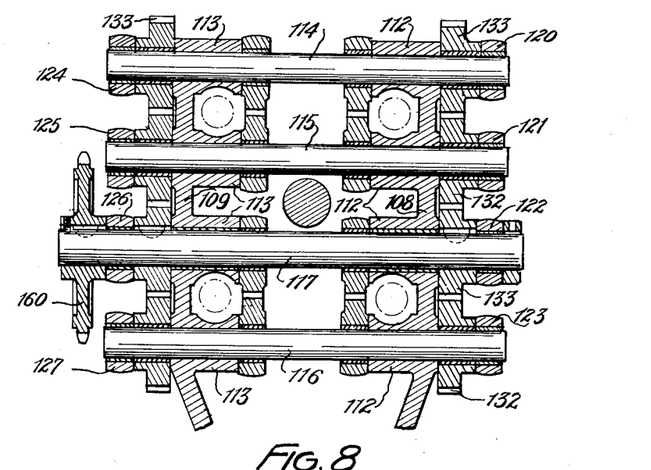
Fig. 8 is a view with parts in section taken on the line 8—8 of Fig. 7.
Figure 9:
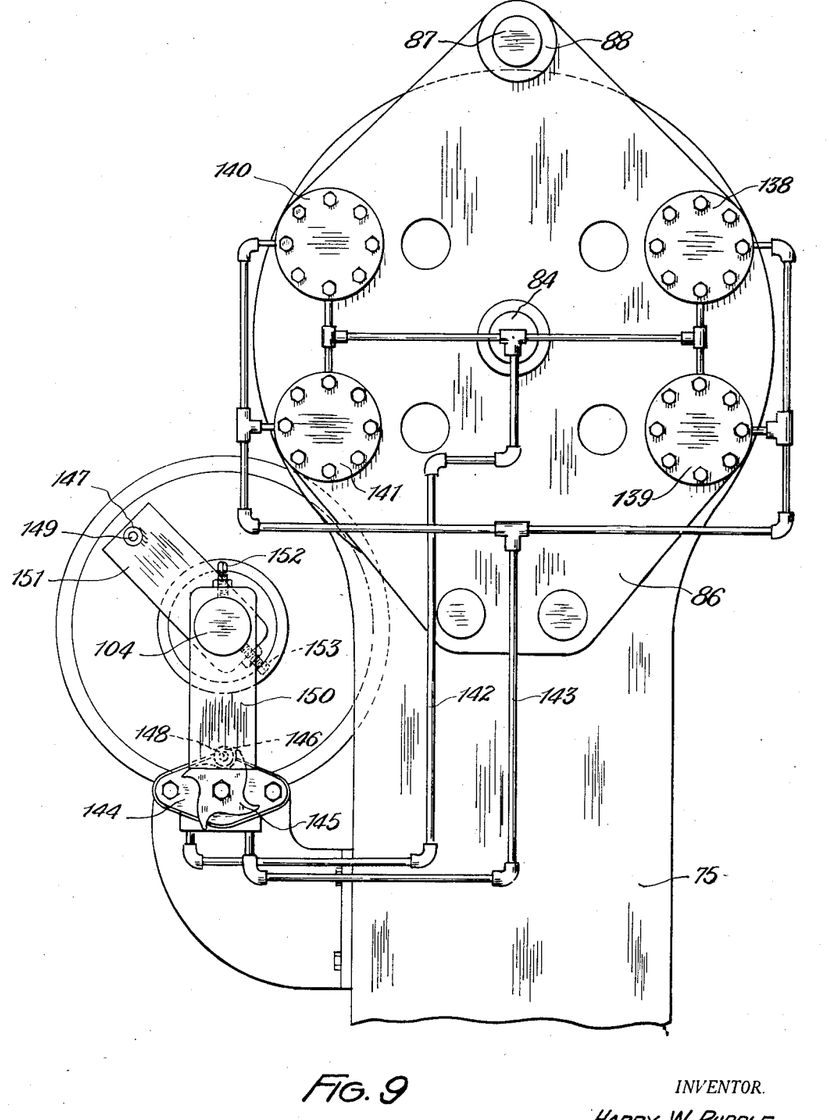
Fig. 9 is an end view of the stock feeding mechanism shown in Fig. 6.
Figures 10, 11, 12:
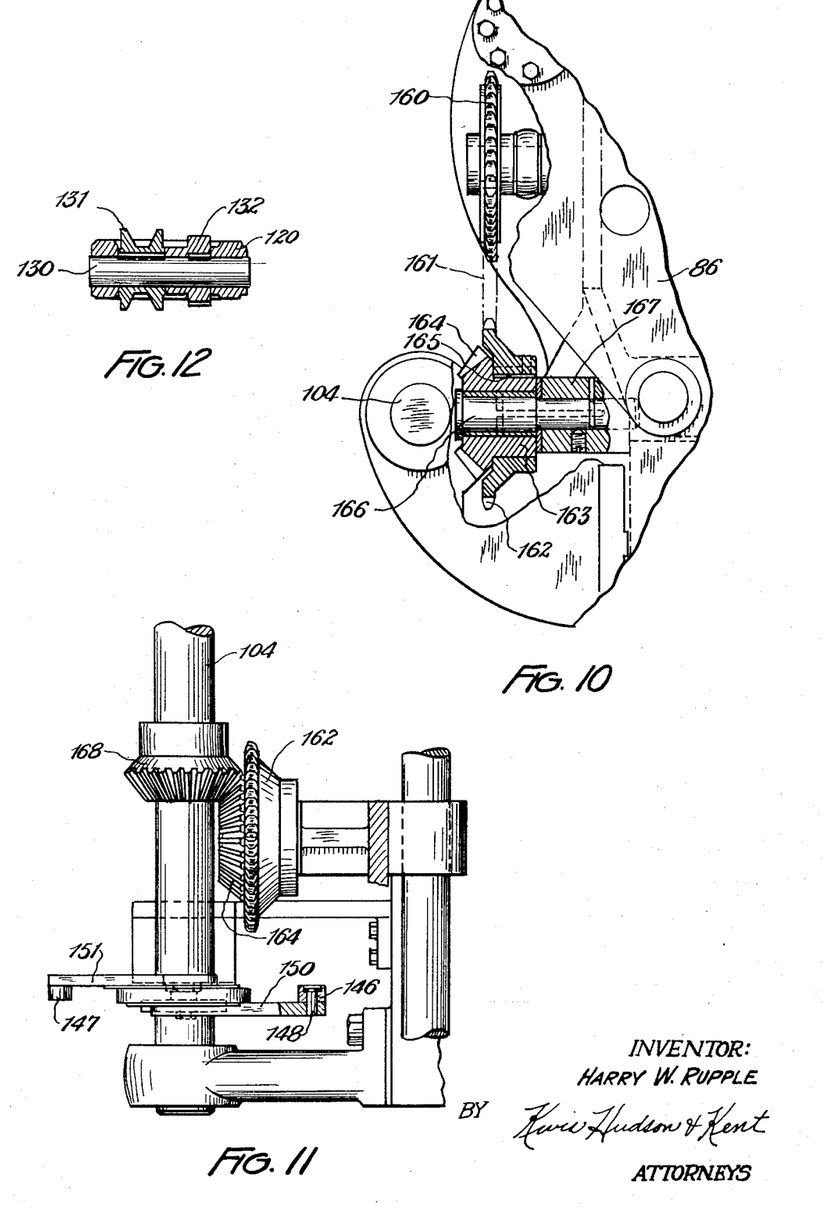
Fig. 10 is an enlarged view of the stock feed driving mechanism.
Fig. 11 is a plan view with portions in section of the valve operating and feed driving mechanism.
Fig. 12 is a view on the line 12—12 of Fig. 7.

The stock feeding mechanism proper is supported on the bracket 86 which has two web sections 108 and 109 projecting therefrom toward the right as viewed in Fig. 6. The web sections 108 and 109 are provided with bosses 110 having openings through which the rods 99 extend, and are connected together near their free ends by reenforcing webs 111. The web sections 108 and 109 are provided with a plurality of bosses 112 and 113, respectively, in which the shafts 114, 115 and 116 are non-rotatably supported and the shaft 117 rotatably supported.

A plurality of U-shaped members 120 to 127 inclusive, similar in construction, are pivotally mounted on the shafts 114 to 117 inclusive and carry near the closed ends thereof short shafts 130, each of which has keyed thereto a feed roller 131 and a gear 132 in mesh with one of the gears 133 rotatably mounted on shafts 114, 115 and 116 and keyed to shaft 117. One leg of the U-shaped members 120 to 127 inclusive is elongated and projects to the left of the shafts 114 to 117 inclusive, as viewed in Figs. 6 and 7. The elongated legs of the two upper U-shaped members 120 and 121, and 124 and 125 and the two lower U-shaped members 122 and 123, and 126 and 127 on the front and rear sides are connected to the ends of piston rods 134, 135, 136 and 137, respectively, by means of links 118. The construction is such that movement of the piston rods 134 to 137 inclusive pivots the U-shaped members 120 to 127 inclusive about the shafts 114 to 117 inclusive and moves the feed rollers 131 to engage or disengage work positioned between the upper and lower rollers on each side.

The piston rods 134, 135, 136 and 137 form part of fluid pressure motors 138, 139, 140 and 141 respectively, to which fluid pressure is conducted and exhausted by the pipes 142 and 143 connected to a rotary valve 144. The valve 144 may be of any well known construction which will successively connect the pipes 142 and 143 with the pressure and exhaust means, pressure being supplied to one pipe while the other pipe is connected to the exhaust, and carries a star wheel 145 adapted to be engaged and operated by cam rollers 146 and 147 mounted on pins 148 and 149 fixed to arms 150 and 151 adjustably mounted on the cam shaft 104, as by the set-screws 152 and 153.

The construction is such that the piston rods 134, 135, 136 and 137 are operated in opposite directions in timed relation to the other operations of the machine and the periods of engagement or disengagement of the feed rollers 131 with the work may be varied by changing the adjustment of the arms 149 and 150.

The feed rollers 131 are driven through the gears 132 and 133, by the following mechanism. The four gears 133 on either side of the machine are in mesh with each other and the two gears on the shaft 117 are keyed to the shaft. The shaft 117 extends to the rear of the machine and carries a sprocket wheel 160 keyed thereon. A sprocket chain 161 connects the sprocket wheel 160 to a sprocket wheel 162 supported on the hub 163 of a bevel gear 164 and keyed thereto by a key 165. The bevel gear 164 is rotatably mounted on a short shaft 166 fixed to a projection 167 of the bracket 86, and is in mesh with and driven by a bevel gear 168 keyed on the cam shaft 104.

While the modification of the feeding mechanism illustrated in Figs. 6 to 12 inclusive is shown applied to a multiple position machine it can, with slight modification of the structure, be adapted for a single position machine and such a construction is within the scope of the present invention. The feed rollers in either the preferred embodiment or the modification shown may be driven by independent means or from a part of the machine continuously or intermittently as desired.

The operation of the device is as follows: When the work is to be fed forward, the cam drum 20 operates the lever 17, to move the member 16 and operate the mechanism 15 to release the chuck jaws, after which the feed rollers 24 and 25 are moved into engagement with the work by the cam drum 56 and the bell crank lever 47, etc., in the case of the preferred embodiment, or by the fluid pressure means in the case of the modification disclosed.

The embodiments of the invention described and illustrated are merely the preferred forms, and I do not intend to be limited to the particular constructions shown, which may be varied within the scope of this invention, and I particularly point out and claim as my invention:

1. A machine tool comprising a frame, a spindle rotatably supported by said frame and adapted to have work pieces fed through the center thereof, a chuck carried by said spindle adapted to engage and disengage the work pieces fed through said spindle, automatic means for operating said chuck at predetermined intervals, a plurality of shafts supported by said frame at opposite sides of the axis of said spindle, levers pivotally supported by said shafts, a plurality of rollers supported in the free ends of said levers and movable towards and from the axis of said spindle, means for driving a plurality of said rollers, a weight supported by said shaft for continuously urging said rollers towards the axis of said spindle, and cam means for moving said rollers in a direction away from the axis of said spindle in predetermined timed relation to the operation of said chuck.

2. In a machine tool comprising a frame, a spindle rotatably supported by said frame and adapted to have work pieces fed through the center thereof, a chuck carried by said spindle adapted to engage and disengage work pieces fed through said spindle, automatic means for operating said chuck at predetermined intervals, levers pivotally supported by said frame at opposite sides of the axis of said spindle, a plurality of rollers supported by said levers at one end thereof and movable towards and from the axis of said spindle, means for driving a plurality of said rollers, a member movable parallel to the axis of said spindle, links pivotally connected to said member and said levers, and automatic means for moving said member in predetermined timed relation to the operation of said chuck.

3. In a machine tool comprising a frame, a spindle rotatably supported by said frame and adapted to have work fed through the center thereof, a chuck carried by said spindle adapted to engage and disengage said work, automatic means for operating said chuck at predetermined intervals, levers pivotally supported by said frame at opposite sides of the axis of said spindle, a plurality of rollers supported by said levers and movable towards and from the axis of said spindle, means for rotating a plurality of said rollers, a member movable longitudinally of said machine, fluid pressure actuated means for moving said member, links pivotally connected to said member and said levers and means for automatically controlling the flow of fluid to said fluid pressure actuated means.

4. In a machine tool, the combination of a work spindle adapted to have work pieces fed through the center thereof, a chuck carried by said spindle adapted to engage and disengage work pieces fed through said spindle, automatic means for operating said chuck, a plurality of rollers radially positioned above the axis of said spindle adapted to engage and disengage work pieces and feed the same through said spindle, means for driving a plurality of said rollers, yielding means for continuously urging said rollers towards the axis of said spindle, and automatic means for moving said rollers in a direction away from the axis of said spindle, in predetermined timed relation to the operation of said chuck.

5. In a machine tool, the combination of a frame, a work spindle adapted to have work pieces fed through the center thereof rotatably supported by said frame, a chuck carried by said spindle adapted to engage and disengage work pieces fed through said spindle, automatic means for operating said chuck, levers pivotally supported by said frame adjacent said spindle, means for operatively connecting said levers whereby the same move in unison about their pivots, a plurality of rollers carried by said levers and adapted to engage work pieces and feed the same through said spindles, means for driving a plurality of said rollers, yielding means for continuously urging said rollers towards the axis of said spindle, and automatic means for moving said rollers in a direction away from the axis of said spindle in predetermined timed relation to the operation of said chuck.

6. In a multiple spindle machine tool comprising a frame, a plurality of spindles adapted to have work pieces fed through the center thereof rotatably supported by said frame, a chuck carried by each of said spindles adapted to engage and disengage work pieces fed through said spindles, means for operating said chucks including a chuck thimble slidably supported on each of said spindles, a member slidably supported by said frame and adapted to engage a plurality of said chuck spindles, means for moving said member, a plurality of levers pivotally supported by said frame at opposite sides of the axis of each of said spindles, a plurality of rollers supported by said levers at one end thereof and movable towards and from the axis of said spindles, means for driving said rollers, and means for moving said levers about their pivots in predetermined timed relation to the means for moving said member whereby said rollers are moved towards and from the axis of said spindles.

HARRY W. RUPPLE.